May 13, 1969     K. H. MEUSEL     3,443,730
DOLLY HOLDER
Filed Sept. 12, 1967
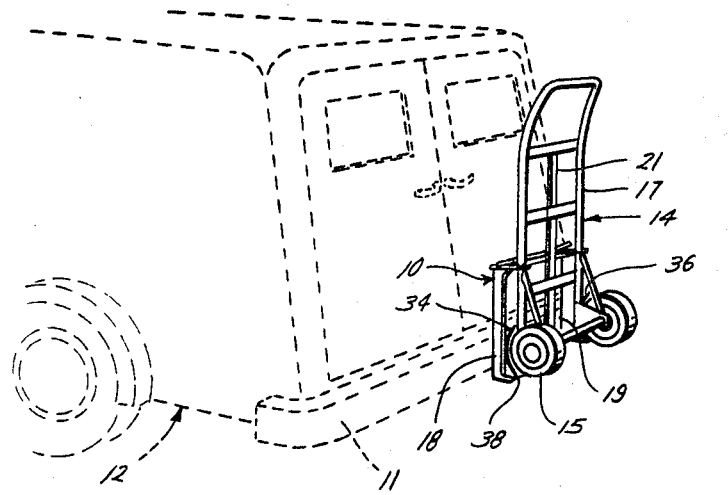
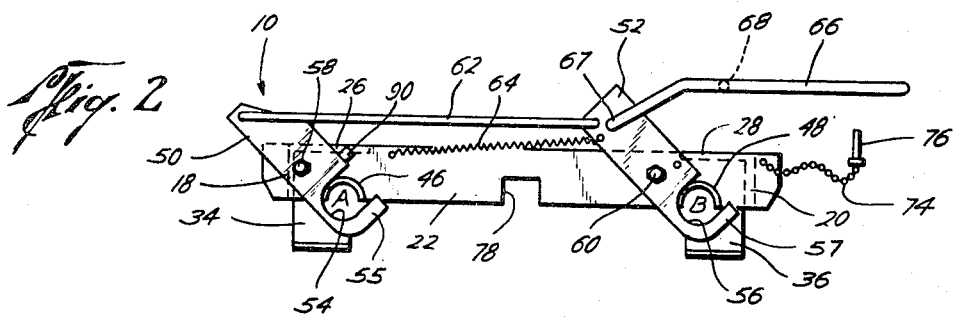
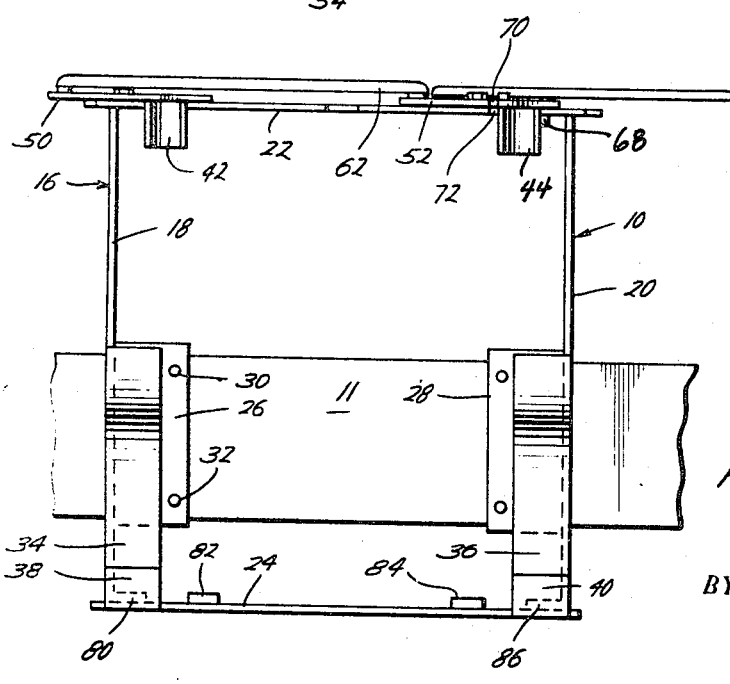
Kurt H. Meusel
INVENTOR
BY Arnold, Roylance, Kruger & Durkee
ATTORNEYS United States Patent Office 3,443,730
Patented May 13, 1969

3,443,730
DOLLY HOLDER
Kurt H. Meusel, 210 York, South Houston, Tex. 77587
Filed Sept. 12, 1967, Ser. No. 667,147
Int. Cl. B60r 9/06, 11/06
U.S. Cl. 224—42.03                                    8 Claims

ABSTRACT OF THE DISCLOSURE

Apparatus is provided for retaining a dolly in releasable engagement on a delivery truck. The apparatus includes a generally rectangular frame, curved brackets and cradles for receiving the wheels and arms of the dolly, and latching blades coacting with the frame to provide openings through which the arms of the dolly fit and are retained. The latching arms are biased toward the closed position, so that unless an external force is applied, the latches will hold the dolly in the frame. A look may be inserted through the latching arms and frame to lock the dolly in the holder.

Background of the invention

Wheeled platforms commonly known as "dollies" are used in many applications in the transport of heavy loads for short distances. These dollies are platforms which are disposed on wheels, rollers or casters. When heavy objects such as pieces of furniture or appliances, or a plurality of objects combining to make a heavy load, such as cases of beer or soft drinks, are placed on the platform, it is relatively easy for a delivery man or mover to transport the same from place to place. Frequent use of dollies is made by those who are called upon to deliver goods, wherein the dolly is used in transporting the goods to and from the delivery vehicle. Examples of use in this manner are the uses made by those who deliver beer, soft drinks, and bread.

Serious problems have developed in recent years with the use of dollies in this manner. The primary problem is that theft of such dollies from delivery vehicles has increased at an alarming rate and has reached such proportions that the affected firms (such as bakeries, beer distributors, and bottling plants—and their insurors) are losing many thousands of dollars a year because of such thefts.

Expressed in broader terms, the problem is that there is no suitable means for retaining a dolly on a delivery vehicle. If they are left during periods of nonuse, such as during movement of the vehicle, on the exterior of the vehicle, then they are not only prone to theft but are also susceptible to falling from the vehicle. This is something which happens very infrequently, but when it does it can cause disastrous consequences since as is readily seen a falling dolly from a truck in high-speed freeway traffic can cause a major traffic accident resulting in bodily injury and property damage. To guard against such accidents, the driver must be very careful and go to some length (at the cost of his time) to secure the dolly to the vehicle by some means such as chains or ropes or the like. But of course such securing means are most cumbersome, insecure, laborious, and in general unsatisfactory.

To overcome these difficulties, the dolly may be housed on the inside of the vehicle. But this is cumbersome also, and more importantly it takes up valuable space which is thus rendered unavailable for the transport of goods. And if the dolly is not fastened even on the inside of the vehicle, it may be a nuisance and a danger because of its sliding or rolling around and consequent rattling and collision with objects in the vehicle interior.

It is in solution of these prior art problems that the present invention finds its utility.

Summary of the invention

The present invention relates to apparatus for securely and releasably fastening a dolly to a delivery vehicle. More particularly, it relates to a dolly holder apparatus which may be rigidly affixed to either the interior or exterior of a vehicle, in a location on the vehicle which is out-of-the-way and otherwise unused, and into which a dolly may be firmly secured and, if desired, locked. The dolly may be quickly inserted and clamped into, and just as readily disengaged from, the dolly holder apparatus of this invention.

Brief description of the drawings

FIGURE 1 is a pictorial view illustrating a dolly holder apparatus in accordance with one embodiment of this invention, in position on a delivery vehicle and retaining a dolly therein;

FIGURE 2 is a top view of the dolly holder illustrated in FIGURE 1; and,

FIGURE 3, is a front view of the dolly holder illustrated in FIGURES 1 and 2.

Detailed description of the illustrated embodiments

Referring now in more detail to the specific embodiments of the invention illustrated in the accompanying drawings, there is seen in FIGURE 1 a dolly holder apparatus 10 in position on a delivery vehicle 12, and retaining a dolly 14 therein. The "dolly" referred to herein is a platform vehicle useful in moving heavy loads from place to place, and comprising generally wheels 15, arms 17, and platform 19. It will be readily understood that various types of dollies may be retained in accordance with the apparatus constructed in accordance with this invention, and the specific type of dolly here illustrated is just one embodiment of such a dolly.

The exact construction of the apparatus 10 may be more clearly seen in FIGURES 2 and 3. Here it is seen that the holder 10 comprises a generally rectangular frame 16 of rigid metal construction or the like, made-up of parallel lateral upper frame member 22 and lower frame member 24, connected by spaced-apart longitudinal side frame members 18 and 20, which join the lateral members 22 and 24 at right angles and may be welded thereto. Each of the frame members 18, 20, 22 and 24 is desirably an elongate flat plate member. In the normal context of use, the apparatus will be mounted on the vehicle so that the longitudinal members will assume a vertical orientation and the lateral members will assume a horizontal orientation.

Mounting on a suitable surface such as the bumper 11 of a vehicle such as a bread truck, beer truck, soft drink truck, or department store delivery truck, may be accomplished in any suitable manner. For example, as shown in this embodiment the longitudinal frame members 18 and 20 may each include a mounting plate 26, 28 respectively. Each of said plates may include a pair of holes 30 and 32. It will be readily understood that when the holder is positioned on the vehicle so that the mounting plates 26 and 28 are flush against the bumper or against a wall of the vehicle, and suitable holes are located in the bumper or wall to correspond to the holes 30 and 32, suitable fastening means such as nuts and bolts may be inserted through the holes 30 and 32 and through the corresponding holes in the bumper or vehicle wall, to securely fasten and lock the holder apparatus 10 in place on the vehicle. In this connection, it is seen that the holder 10 is, in the FIGURE 1 embodiment, affixed to the bumber 11 of the delivery truck 12 there illustrated, in the manner described above. The fastening means used may be selected so that the holder apparatus 10 becomes practically a permanent fixture on the vehicle. That is, it would be extremely difficult to dislodge the holder from the vehicle. Otherwise, of course, the very purpose for the holder itself would be defeated.

The mounting plates 26 and 28 are in this embodiment flat plates which are securely affixed (as by welding) to the longitudinal members 18 and 20 of the frame 16, the plates being spaced an equal distance from the lower lateral member 24 of the frame and near said lower lateral frame member. These mounting plates are disposed at right angles with the longitudinal members 18 and 20, and are flushed with the rear of the longitudinal members so that no part of the members 18 and 20 protrudes rearwardly beyond the mounting plates. This is to assure that the mounting plates may be flush-mounted against the vehicle bumper or wall.

Means are provided on the holder apparatus 10 for receiving in fitting relationship the wheels 15 and the arms 17 of the dolly 14. Means for so receiving the wheels 15 may desirably comprise a pair of curved brackets 34 and 36, one of said brackets being located on each of the longitudinal members 18 and 20. These brackets have a radius of curvature approximately equal to the radius of curvature of the dolly wheels. It will be readily understood that such brackets may be sized to fit the wheel size of the particular dollies employed.

The brackets are positioned in equidistant relation from the lower frame member 24, and the lower end of each bracket is joined to the frame member 24 by a plate 38, 40 which is inclined from the lower end of the bracket to the member 24 at one end thereof. These plates 38 and 40 serve to guide the dolly wheels into position and to keep the wheels from becoming lodged in the space behind the mounting plates.

In the upper lateral frame member 22, at the front portion thereof, are a couple of spaced-apart half-circle recesses 46 and 48, equidistantly spaced from the center of the frame member 22. These recesses are adapted to receive the two arms 17 of the dolly 14. A pair of semicylindrical cradles 42 and 44 of a size adapted to fit against the arms of the dolly are joined to the upper frame member 22 and extend downwardly therefrom in a manner such that one end of each cradle forms one of the recesses 46, 48. The arms 17 of the dolly 14 fit against these cradles and thence through the recessed portions 46, 48 of the upper frame member 22.

Latching means are included in association with the frame member 22 to securely retain the dolly arms in the recesses 46, 48. Such means may desirably comprise the similar latching blades 50 and 52, one of said blades being associated with each of the recesses 46 and 48. Each of the blades 50 and 52 is constructed with a generally U-shaped recessed portion 54, 56, forming at one end of each of the latching blades a retaining finger 55, 57, respectively. U-shaped recesses 54 and 56 are adapted to be positioned adjacent the recesses 46 and 48, respectively to be contiguous therewith, so that openings A, B are defined by the recessed portions 46, 48 and the contiguous recessed portions 54, 56 of the latching blades. The fingers 55, 57 act to open and close these openings by moving into and out of juxtaposition with the top frame member 22 upon pivoting of the blades 50, 52.

The latching blades 50 and 52 are thus positioned against the top of upper frame member 22 in such a manner that the U-shaped recesses 54 and 56 are adapted to coact with the recessed portions of the frame member 22 in the above-described manner. Each of the latching blades 50 and 52 is pivotally fastened against the top of frame member 22 by any suitable means, such as the pivot pins 58 and 60, said pins each being secured as by a threaded connection to the frame member 22, and having a head to retain the latching blade in place. The blades 50 and 52 pivot about the pivot pins 58 and 60, respectively, so that the U-shaped recesses move into and out of juxtaposition with the recesses 46 and 48. Thus the opening formed by the respective recesses may be alternately opened and closed by pivoting of the latching blades.

Attached to each of the latching blades 50 and 52 at a point on the opposite side of the pivot point from the U-shaped recess, is a finger 62 which connects the two blades and causes them to pivot together. The pivoting of the blades may be desirably accomplished by movement of the operating handle 66 one end 67 of which is attached to the latching blade 52.

The latching blades are biased so that they will normally remain in the "closed" position illustrated in FIGURE 2. This may be accomplished by providing the blade 52 with suitable resilient means for biasing the retaining fingers 55, 57 so that they will be in juxtaposition with the top frame member 22 to cover the openings A, B. Such means may desirably take the form of the coil spring 64, one end of which is affixed to the end of latching blade 52 pivotally opposite the retaining finger 57, and the other end of which is attached to a suitable point on the upper frame member 22.

It is thus seen that movement of the handle 66 back and fourth is operable to rotate each of the latching blades 50 and 52 about their respective pivot pins 58 and 60, and thus to open and close the openings A and B. But when no external force is exerted on the handle 66, the spring 64 acts to securely hold the latching blades in the closed position. Movement of the handle on opening may be desirably limited by means of the stop 68 which depends from the handle 66 and is operable to abut the upper frame member 22 upon sufficient opening of the latching blades. Movement on closing when the holder is empty is limited by the stop 90 which is affixed to the latching blade 50.

As thus described, it is seen that when the arms of a dolly are placed through the openings A and B, and the latching blades pivoted to close the openings A, B, the dolly arms are held securely in place and the dolly thus cannot be removed from the holder unless the latching blades are again rotated to the open position. The dolly is thus securely, and releasably, held in place in the dolly holder apparatus.

Means are desirably included to lock the dolly in place in the dolly holder. This may be done by locking the latching blades in the closed position illustrated in FIGURE 2. Such locking means may comprise a hole through one of the latching blades to register with a corresponding hole in the dolly frame, and a lock for positioning through such holes. In the illustrated embodiment, the latching blade 52 has a hole 70 therein, which registers when the latching blade is in the closed position, with the hole 72 in the upper frame member 22. A lock pin 76 is attached to the upper frame member 22 by means of a chain 74, and is thus available for insertion into the holes 70, 72 to retain the latching blades in the closed position, so that the lock pin must be removed before the latching blades can be opened. If it is desired to lock the holder, any suitable locking means such as a padlock may be inserted through the holes 70, 72. Thus only the person with the key or combination can open the latching blades to remove the dolly.

Further means for receiving the dolly 14 in fitting relationship may be provided on the apparatus 10. It will be understood that such means may be included or omitted, and if included may be varied in size and shape, depending on the particular dolly employed. Such further means may desirably comprise a generally rectangular recessed portion 78 in the upper frame member 22, into which the central longitudinal support member 21 of the dolly 14 may fit, and the guides 80, 82, 84 and 86 which are suitably spaced to fit the extensions on the dolly 14.

It is thus seen that apparatus is provided which may be mounted on a vehicle, and which is adapted to receive a dolly in fitting relationship. The dolly may be secured to the dolly holder in locking or nonlocking relationship, and is easily releasable therefrom.

Through use of the holder thus described, dollies may be retained in a convenient location on the truck, and loss through theft is avoided.

In the illustrated embodiment, the holder on the bumper of a panel truck 12 blocks one of the doors of the truck. This can usually be tolerated since loading and unloading can be accomplished through the other door. But if both doors are needed, the holder can be mounted instead on the side of the truck. This problem is not generally faced with other types of vehicles.

While the invention has been described in terms of a particularly advantageous embodiment which is at the time of this application the best mode known to the inventor, it is obvious that various changes might be made in the structures specifically shown without departing from the scope of the invention.

What is claimed is:

1. Apparatus suitable for releasably retaining a dolly of the type comprising wheels, arms, and a platform on which a heavy load may be positioned, comprising:
   a generally rectangular frame having upper and lower frame members, and side members connecting said upper and lower frame members;
   mounting plates on said frame for securing said frame to a suitable surface;
   curved brackets on said frame for receiving in fitting relationship the wheels of a dolly, the radius of curvature of said brackets being approximately equal to the radius of curvature of the wheels of the dolly;
   latching means associated with the upper frame member to alternately open and close openings adapted to receive the arms of said dolly; and,
   means for locking the arms of said dolly in said openings, whereby the dolly may be firmly held in said apparatus but may be quickly disengaged therefrom upon release of said latching means.

2. Apparatus suitable for releasably retaining a dolly of the type comprising wheels, arms, and a platform on which a heavy load may be positioned, comprising:
   a frame;
   mounting plates on said frame for securing said frame to a suitable surface;
   curved brackets on said frame for receiving in fitting relationship the wheels of a dolly;
   latching means associated with said frame for alternatively opening and closing openings adapted to receive the arms of said dolly; and,
   means for locking the arm of said dolly in said openings, whereby the dolly may be firmly held in said apparatus but may be quickly disengaged therefrom upon release of said latching means.

3. Apparatus in accordance with claim 2, wherein said apparatus is mounted to the bumper of a delivery vehicle.

4. Apparatus in accordance with claim 2, wherein said latching means are pivotally mounted on said frame, and said openings are formed between said frame and said latching means.

5. Apparatus suitable for releasably retaining a dolly of the type comprising wheels, arms, and a platform on which a heavy load may be positioned, comprising:
   a generally rectangular frame having upper and lower frame members, and side frame members connecting said upper and lower frame members;
   mounting plates affixed to said side frame members for securing said frame to a delivery vehicle;
   curved brackets on said side frame members for receiving in fitting relationship the wheels of a dolly, the radius of curvature of said brackets being approximately equal to the radius of curvature of the wheels of said dolly;
   spaced-apart recessed portions in one side of said upper frame member;
   latching blades pivotally mounted on said upper frame member for rotating movement next to said recessed portions, so that openings are defined between said latching blades and said recessed portions, and whereby said latching blades are adapted upon pivotal movement to open and close said openings, said openings being adapted to receive the arms of said dolly;
   means joining said latching blades to cause said blades to move together;
   resilient means biasing said blades toward the closed position;
   means for locking the arms of said dolly in said openings, whereby the dolly may be firmly held in said apparatus but may be quickly disengaged therefrom upon release of said latching blades.

6. Apparatus in accordance with claim 5, wherein semi-cylindrical cradles are attached to said upper frame member at each of said recessed portions, said cradles being shaped to receive the arms of said dolly in fitting relationship.

7. Apparatus in accordance with claim 5, wherein said locking means comprises registering holes in one of said latching blades and in said upper frame member, and a lock for insertion through said registering holes when said latching blades are in a closed position.

8. Apparatus in accordance with claim 5, wherein said locking means comprises registering holes in one of said latching blades and in said upper frame member, and a lock pin chained to said upper frame member and suitable for insertion through said registering holes when the latching blades are in the closed position.

References Cited

UNITED STATES PATENTS

| | | | |
|---|---|---|---|
| 2,476,814 | 7/1949 | Carmack et al. | 293—69 XR |
| 2,686,060 | 8/1954 | Couse | 293—69 XR |

GERALD M. FORLENZA, *Primary Examiner.*

U.S. Cl. X.R.

224—42.38, 42.45